US012576972B2

(12) United States Patent (10) Patent No.: US 12,576,972 B2
Kodati (45) Date of Patent: Mar. 17, 2026

(54) SMART AIR GASPER IN THE PASSENGER SERVICE UNIT

(71) Applicant: B/E Aerospace, Inc., Winston Salem, NC (US)

(72) Inventor: Sambasiva Rao Kodati, Krishna District (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 408 days.

(21) Appl. No.: 18/191,713

(22) Filed: Mar. 28, 2023

(65) Prior Publication Data

US 2024/0246679 A1 Jul. 25, 2024

(30) Foreign Application Priority Data

Jan. 24, 2023 (IN) .............................. 202341004643

(51) Int. Cl.
| | |
|---|---|
| *B64D 13/00* | (2006.01) |
| *B60H 1/00* | (2006.01) |
| *B60H 1/34* | (2006.01) |
| *B64F 5/10* | (2017.01) |
| *F24F 9/00* | (2006.01) |

(52) U.S. Cl.
CPC ......... *B64D 13/00* (2013.01); *B60H 1/00828* (2013.01); *B60H 1/00871* (2013.01); *B60H 1/3421* (2013.01); *B60H 1/345* (2013.01); *B64F 5/10* (2017.01); *F24F 9/00* (2013.01); *B60H 2001/3478* (2013.01); *B64D 2013/003* (2013.01); *F24F 2009/002* (2013.01)

(58) Field of Classification Search
CPC ..... B64D 13/00; B64D 2013/003; B64F 5/10;
B60H 1/00828; B60H 1/00871; B60H 1/3421; B60H 1/345; F24F 3/00; F24F 2009/002; B64H 2001/3478
USPC ......................................................... 454/71
See application file for complete search history.

(56) References Cited

U.S. PATENT DOCUMENTS

| | | | |
|---|---|---|---|
| 6,719,623 B1 | 4/2004 | Kodaveridan et al. | |
| 9,965,931 B2 | 5/2018 | Reinbold et al. | |
| 10,137,992 B2 | 11/2018 | Blom et al. | |
| 10,906,646 B2 * | 2/2021 | Hakla | B64D 11/0626 |
| 11,267,572 B2 | 3/2022 | Vandyke | |
| 11,387,902 B2 | 7/2022 | Kimsey-Lin | |
| 11,524,794 B2 | 12/2022 | Jha et al. | |
| 2015/0373121 A1 | 12/2015 | Secilmis | |

(Continued)

FOREIGN PATENT DOCUMENTS

| | | |
|---|---|---|
| DE | 102020128366 | 4/2022 |
| WO | 2020208420 | 10/2020 |

OTHER PUBLICATIONS

European Patent Office, European Search Report dated May 24, 2024 in Application No. 24153652.3.

*Primary Examiner* — Avinash A Savani
*Assistant Examiner* — Dana K Tighe
(74) *Attorney, Agent, or Firm* — SNELL & WILMER L.L.P.

(57) ABSTRACT

A gasper module for use in an aircraft. The gasper module including an inlet configured to receive intake air and a first outlet configured to direct a stream of an airflow from the intake air towards a passenger. Also, a second outlet configured to form an air curtain from the intake air between the passenger receiving the direct stream of airflow and an adjacent passenger.

14 Claims, 7 Drawing Sheets

(56)     References Cited

U.S. PATENT DOCUMENTS

| | | | |
|---|---|---|---|
| 2019/0077215 A1* | 3/2019 | Baek | B60H 1/246 |
| 2019/0329889 A1* | 10/2019 | Afonso | B64D 13/00 |
| 2021/0387737 A1 | 12/2021 | Harcup et al. | |
| 2022/0057094 A1 | 2/2022 | Chinnappa Reddy et al. | |
| 2022/0063814 A1 | 3/2022 | Vandyke et al. | |
| 2022/0063815 A1* | 3/2022 | Mitchell | B64D 13/00 |

* cited by examiner

800

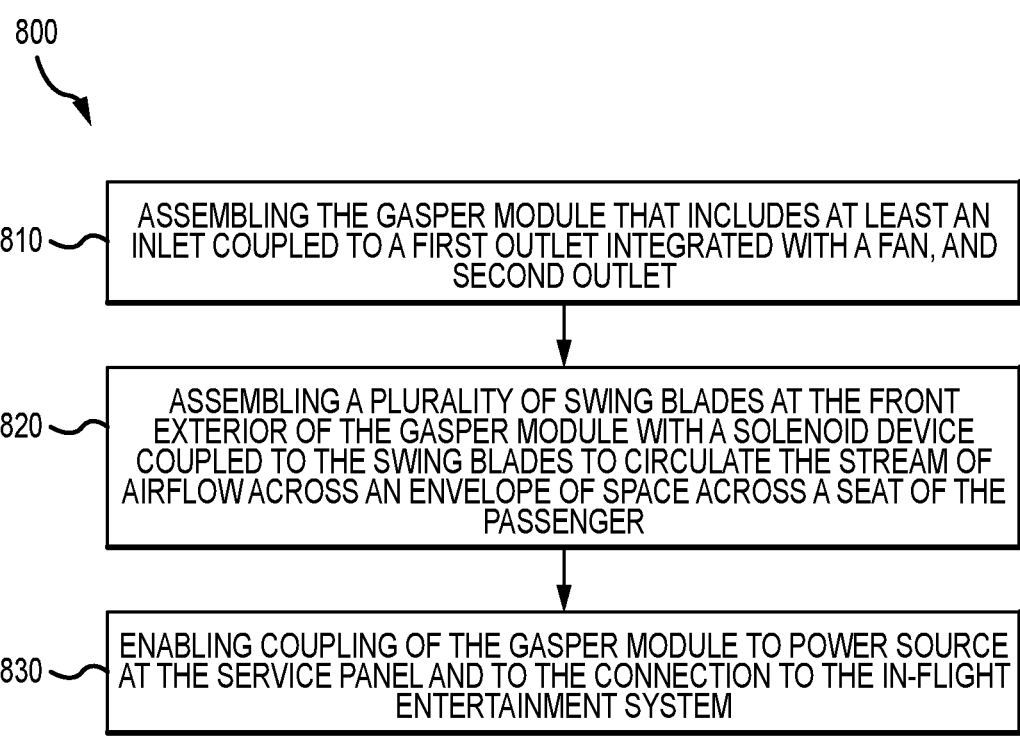

| |
|---|
| 810 — ASSEMBLING THE GASPER MODULE THAT INCLUDES AT LEAST AN INLET COUPLED TO A FIRST OUTLET INTEGRATED WITH A FAN, AND SECOND OUTLET |

820 — ASSEMBLING A PLURALITY OF SWING BLADES AT THE FRONT EXTERIOR OF THE GASPER MODULE WITH A SOLENOID DEVICE COUPLED TO THE SWING BLADES TO CIRCULATE THE STREAM OF AIRFLOW ACROSS AN ENVELOPE OF SPACE ACROSS A SEAT OF THE PASSENGER

830 — ENABLING COUPLING OF THE GASPER MODULE TO POWER SOURCE AT THE SERVICE PANEL AND TO THE CONNECTION TO THE IN-FLIGHT ENTERTAINMENT SYSTEM

FIG.8

SMART AIR GASPER IN THE PASSENGER SERVICE UNIT

CROSS-REFERENCE TO RELATED APPLICATIONS

This application claims priority to, and the benefit of, India Patent Application No. 202341004643 (DAS CODE: EB85), filed Jan. 24, 2023, and titled "SMART AIR GAS-PER IN THE PASSENGER SERVICE UNIT," which is incorporated by reference herein in its entirety for all purposes.

FIELD

The present disclosure relates to gaspers for use in aircraft and, more particularly, to gaspers to control airflow in the cabin by enabling direct airflow with an air curtain to reduce virus transmission between passengers.

BACKGROUND

Passenger aircraft, particularly commercial passenger aircraft, include various features for improving passenger comfort. For example, these aircraft may include reclining seats, seatback infotainment systems, and gaspers. The gaspers direct relatively cool air downward towards the passengers from above the passenger and can be adjusted for both a downward orientation and velocity of exiting air. Direct airflow (i.e., downward airflow) can cause discomfort to passengers. In instances, it is preferred to have distributed or indirect airflow by seated passengers.

Also, direct airflow to passengers can cause increases of transmission of pathogens by more easily spreading water droplets caused by a passenger coughing, sneezing, and/or talking. These water droplets may include pathogens such as bacteria or viruses.

It is desirable to reduce the transmission of pathogens on an aircraft. This may be achieved by reducing the likelihood of the water droplets from one passenger reaching another passenger.

SUMMARY

Disclosed herein is a gasper module for use in a passenger aircraft. The gasper module includes an inlet configured to receive intake air; a first outlet configured to direct a stream of an airflow from the intake air towards a passenger, and a second outlet configured to form an air curtain from the intake air between the passenger receiving a direct stream of airflow and an adjacent passenger.

In various embodiments, the first outlet comprises a fan to increase a velocity of the stream of airflow that is directed toward the passenger.

In various embodiments, the second outlet comprises an output vent that is configured to direct the air curtain at an angle between a passenger receiving directed airflow and the adjacent passenger.

In various embodiments, the fan is configured to rotate in a clockwise direction and a counterclockwise direction for directing the stream of airflow from the first outlet to the passenger and for ceasing the stream of airflow from the first outlet to the passenger.

In various embodiments, the gasper module is configured in response to ceasing the stream of airflow from the first outlet by the fan to the passenger, the second outlet is configured to continue to maintain the air curtain between the passenger and the adjacent passenger.

In various embodiments, the fan continues ceasing the airflow from the first outlet by a continuous operation of rotation while the second outlet continues to maintain the air curtain.

In various embodiments, the gasper module is further including a plurality of swing blades configured with the first outlet that are adjustable by the passenger to circulate the stream of airflow across an envelope of space across a seat of the passenger.

In various embodiments, the gasper module is further including a solenoid device coupled to the plurality of swing blades of the first outlet that enables a back-and-forth motion of the plurality of swing blades to circulate the stream of airflow across the envelope of space across the seat of the passenger.

In various embodiments, the plurality of swing blades can be positioned by selection at positions in a range of 0 degrees to 180 degrees.

In various embodiments, an apparatus for controlling airflow in an aircraft is provided. The apparatus comprises: an inlet; a first outlet; and a second outlet wherein the first outlet is configured to direct a stream of an airflow of intake air from the inlet towards a passenger, and wherein the second outlet is configured to form an air curtain from the airflow of intake air of the inlet between the passenger receiving a direct stream of airflow and an adjacent passenger.

In various embodiment, the apparatus includes a fan configured with the first outlet to increase a velocity of intake air from the inlet that is streamed in the airflow directed toward the passenger.

In various embodiments, the second outlet comprises an output vent that is configured to direct the air curtain between a passenger receiving directed airflow and an adjacent seated passenger.

In various embodiments, the fan is configured to rotate in a clockwise direction and a counterclockwise direction for directing the stream of airflow from the first outlet to the passenger and for ceasing the stream of airflow from the first outlet to the passenger.

In various embodiments, the apparatus further includes in response to ceasing the stream of airflow from the first outlet by the fan to the passenger, the second outlet is configured to continue to maintain the air curtain between the passenger and the adjacent passenger.

In various embodiments, the apparatus further includes a plurality of swing blades configured with the first outlet that are adjustable by the passenger to circulate the stream of airflow across an envelope of space across a seat of the passenger.

In various embodiments, the apparatus includes a solenoid device coupled to the plurality of swing blades of the first outlet that enables a back-and-forth motion of the plurality of swing blades to circulate the stream of airflow across the envelope of space across the seat of the passenger.

In various embodiments, the plurality of swing blades can be positioned by selection at positions in a range of 0 degrees to 180 degrees.

In various embodiments, a method to manufacture of a gasper module in an apparatus to direct airflow in an aircraft is provided. The method includes assembling an inlet to receive intake air; assembling a first outlet to direct a stream of the airflow from the intake air towards a passenger, and assembling a second outlet configured to form an air curtain from the intake air between the passenger receiving a direct stream of airflow and an adjacent passenger.

In various embodiments, the method to manufacture further includes assembling a fan with the first outlet to increase a velocity of intake air from the inlet that is streamed in an airflow directed toward the passenger.

In various embodiments, the method to manufacture further includes assembling a plurality of swing blades configured with the first outlet that are adjustable by the passenger to circulate the stream of airflow across an envelope of space across a seat of the passenger; and attaching a solenoid device to the plurality of swing blades of the first outlet that enables a back-and-forth motion of the plurality of swing blades to circulate the stream of airflow across the envelope of space across the seat of the passenger.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals may denote like elements in at least a portion of the figures.

FIG. 8 illustrates a flowchart of a manufacturing method of a gasper assembly in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
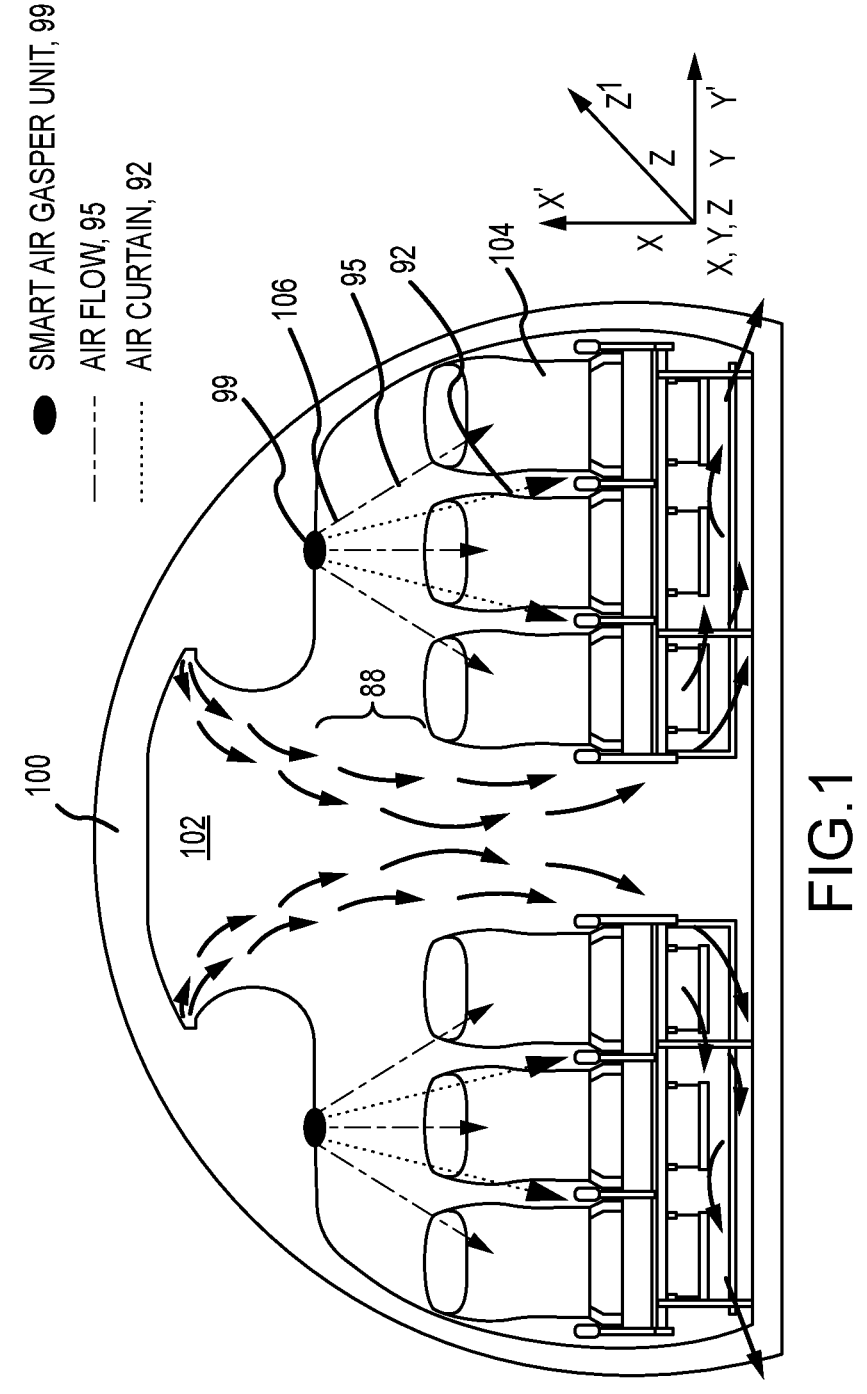
FIG. 1 illustrates a diagram of airflow from a gasper module in a cabin of an aircraft in accordance with various embodiments.

Referring to FIG. 1, FIG. 1 illustrates a diagram of airflow from a gasper module 99 in a cabin 102 of an aircraft 100. The aircraft 100 may include any aircraft such as an airplane, a helicopter, or any other aircraft. The cabin 102 has one or more passenger seat 104 in which one or more passengers may rest. The cabin 102 may include a smart air gasper module ("gasper module") 99 one or more gaspers 106 designed to direct air (e.g., including one or more of filtered air or fresh air from outside of the cabin 102). Although the gasper module 99 is shown in the aircraft cabin 102, one skilled in the art will realize that the gasper module 99 may likewise be installed in a cockpit, lavatory, galley, or other area of an aircraft. A first outlet 95 of the gaspers module 99 (which may be associated with the passenger seat 104) may be designed to direct air towards the passenger seat 104 and another (second) outlet 92 of the gasper module 99 may be designed to form an air curtain to reduce the likelihood of pathogens from a first passenger reaching a second passenger located in the passenger seat 104. In that regard, a beneficial distance 88 between the gasper module 99 and the passenger may provide the greatest reduction in pathogens reaching the passenger. Thus, the gasper module 99 may be positioned to achieve the beneficial distance 88 for any size passenger in the passenger seat 104. As discussed further below, the gasper module 99 may include additional or alternative features that further reduce the transfer of pathogens between passengers in the cabin 102 by enabling direct airflow and an air curtain (or indirect airflow) about the passenger. In various embodiments, the gasper module 99 can be configured for direct airflow in an envelope area (X-Z') to (Y'-Z') that back-and-forth crosses the passenger in the passenger seat in the cabin 102.

Figure 2:
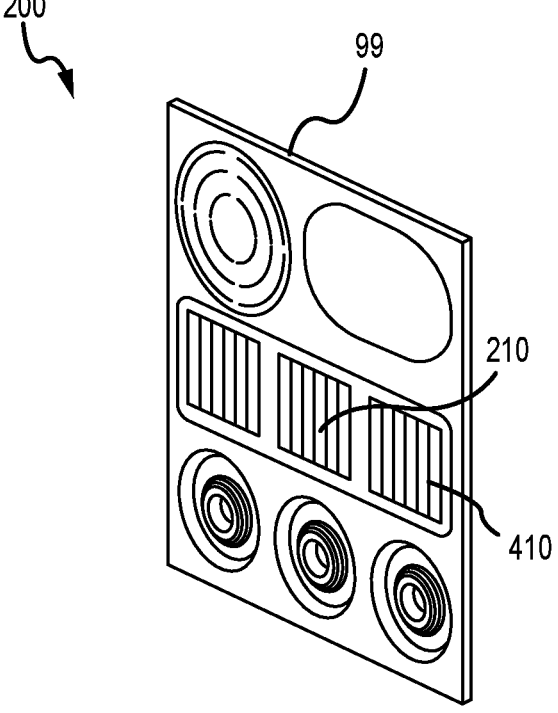
FIG. 2 illustrates a passenger service module with a plurality of gaspers in a smart air gasper module in accordance with various embodiments.

Referring to FIG. 2, FIG. 2 illustrates a smart passenger service module 99 with a plurality of smart air gaspers 210 with swing blades 410 that configures to a legacy passenger service module footprint and is swapped out with a smart air gasper module 99 in accordance with various embodiments. The smart air gasper module (gasper module 99) is sized to confirm to the footprint available in legacy passenger service module.

Figure 3:
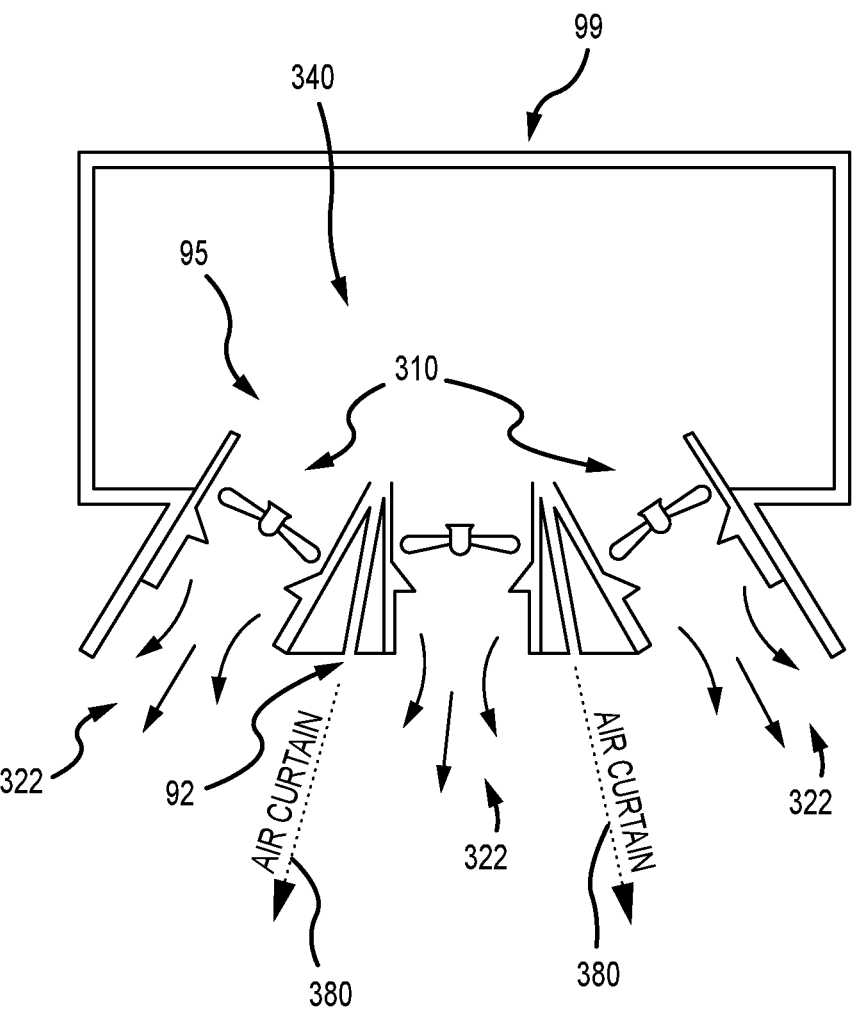
FIG. 3 illustrates a gasper module with a set of first outlets configured with fans and a set of second outlets configured to form an air curtain for passenger seats in accordance with various embodiments.

Referring to FIG. 3, FIG. 3 illustrates a gasper module with a set of first outlets configured with fans and a set of second outlets configured to form at least a single air curtain for passenger seats in accordance with various embodiments. FIG. 3 shows a gasper module 99 with a set of first outlets 95 and a second set of outlets 92. In various embodiments, the first set of outlets 95 is associated with a gasper 322 and is each configured with a fan 310 controllable by the passenger inflight entertainment (IFE) control. The passenger via the IFE control can adjust the speed of the fan to control the velocity of the airflow directed at the passenger. In various embodiments, the passenger via IEF control can adjust (via a flow adjuster mechanism) the airflow from the fan 310 rotation through clockwise and counterclockwise rotational operation of the fan 310 to cause the airflow directed at the passenger to be reduced, ceased or increased. The blades of the fan 310 augment the velocity of the airflow (i.e., the outgoing air) from the gasper module 99 where the intake air is received with under pressure. The counterclockwise rotation of the fan 310 prevents flow of the airflow through each inlet 340 or channel associated with each gasper 322 of the pressure air sent from a main blower. The counterclockwise rotation of the fan 310 does not interfere with the airflow of the second outlet 92 and allows the airflow (i.e., the pressured airflow) to be maintained through the second outlet 92 and hence the air curtain is continually formed (even when the airflow through the first outlet is shut off). In this way, the intake air received (i.e., pressurized airflow) continues to flow through the second outlet 92 but is controllably stopped or reduced in flow rate in the first outlet 95 by the fan 310 counter rotation of airflow.

In various embodiments, the high-pressure airflow is maintained through the second outlet 92 while the high-pressure airflow is retarded in flow through the first outlet 95 by the counter rotation of the fan 310. The air curtain generated is continuously maintained regardless of forward or reverse airflow caused by the fan 310 through the gasper 322. The air curtain 380 is configured by the second outlet 92 which is angled to enable a protective divider between the passenger seats.

Figure 4:
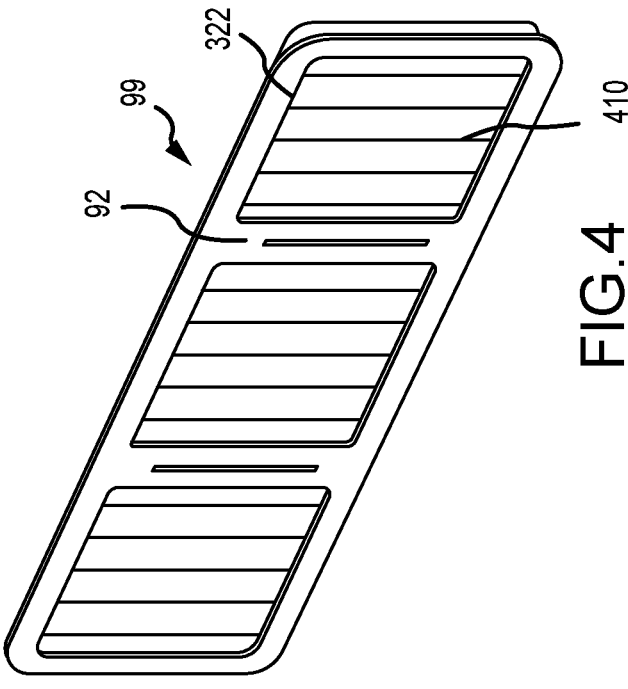
FIG. 4 illustrates a diagram of a gasper module with swing blades in accordance with various embodiments.

FIG. 4 illustrates a diagram of a gasper module 99 with swing blades 410 in accordance with various embodiments. In FIG. 4, there is shown a gasper module 99 with swing blades 410 that are configured with each gasper 322. The swing blades 410 are adjustable by the IFE control for each passenger seat. In various embodiments, the passenger using different control setting can adjust the direction of the air flow from each gasper 322. The passenger can adjust the angle of the swing blades in a range of 0 degrees to 180 degrees to cause the air flow across an envelope that encompasses the passenger seat. In various embodiments, the passenger using control settings of the IFE can cause the swing blades 410 to rotate dynamically in a back-and-forth motion to cause the airflow to move back-and-forth over the passenger seat. In various embodiments, the passenger using setting of the IFE can cause the swing blades 410 to be statically positioned at a variety of angles to direct the airflow at the passenger in the passenger seat as desired.

Figure 5:
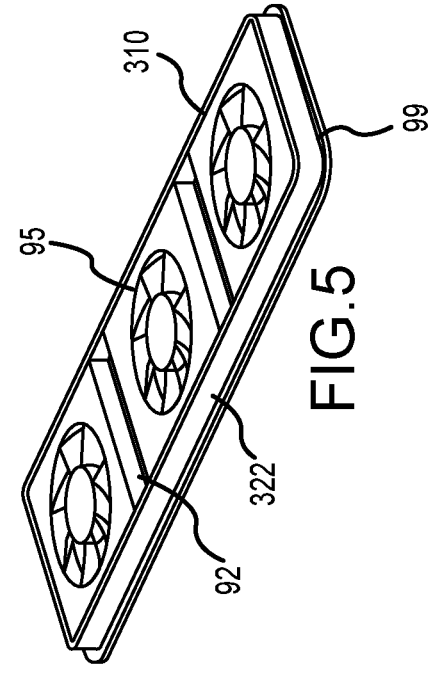
FIG. 5 illustrates a gasper module with a plurality of fans in each gasper in accordance with various embodiments.

FIG. 5 illustrates a gasper module 99 with a plurality of fans 310 in each gasper in accordance with various embodiments. In FIG. 5, the passenger, via the IFE, can adjust the fan 310 in the gasper module 99 to increase or lower the fan 310 speed and corresponding velocity of the airflow through the gasper 322. In various embodiments, the passenger can control the fan 310 to rotate clockwise or counterclockwise to cause increases or decreases or ceasing of the output of airflow from the first outlet 95 of the gasper 322 while maintaining a consistent airflow through the second outlet 92.

Figures 6A, 6B:
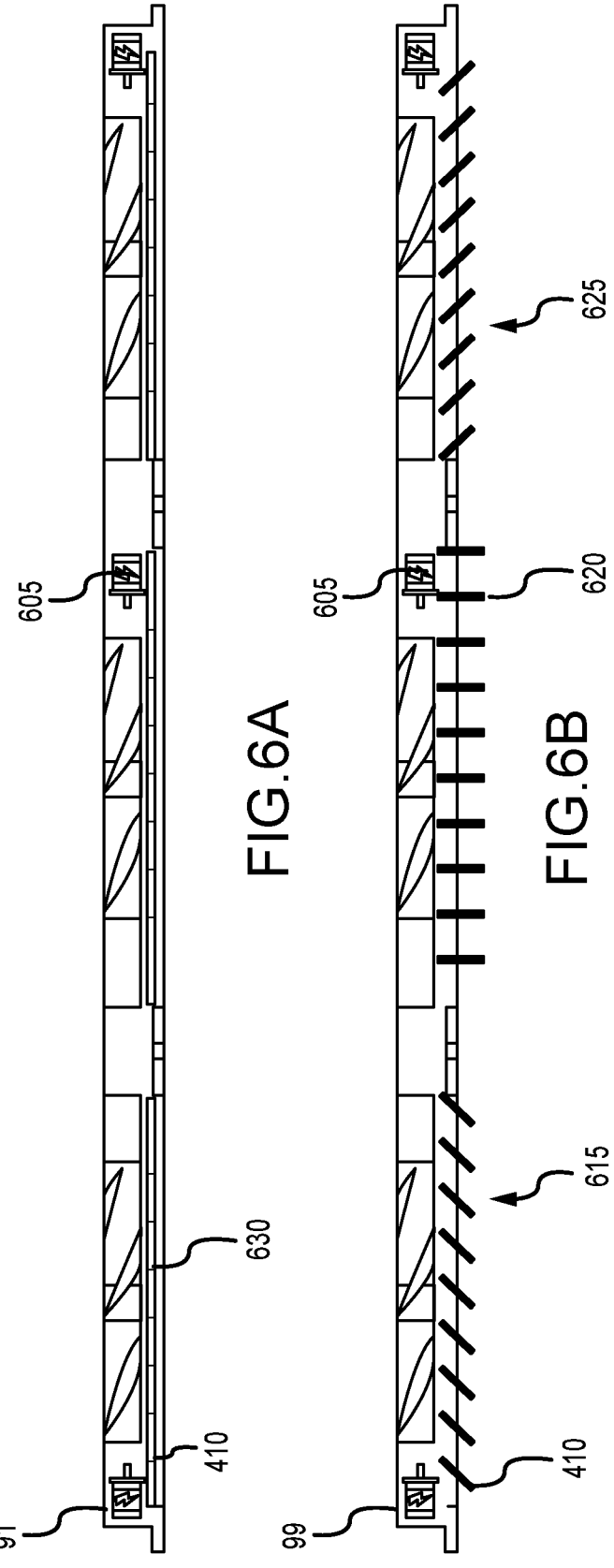
FIGS. 6A and 6B illustrate swing blades to the gasper in a closed position and in an open position, respectively, in accordance with various embodiments.

FIGS. 6A and 6B disclose the swing blades to the gasper in a closed position and in an open position in accordance with various embodiments. In FIG. 6A, the swing blades 410 are caused to be closed by the solenoid motor 605 configured with the swing blades 410 which is operated to rotate in a particular direction via control setting of the IFE control by, for example, the passenger. In FIG. 6B the swing blades 410 are caused to be in an open position by operation of the solenoid motor 605 that causes the swing blades 410 to move via rotation to an open position. In various embodiments, the swing blades 410 are positioned at different angles from the front surface 630 For example, the swing blades 410 are configured to stream airflow and a set of angles by changing the position of the swing blades 410 at different angles from in open positions from the front surface 630 that include at least a first angle 615, second angle 620, and third angle 625 that cause different angles of airflow towards the passenger seating area. In various embodiments, if the passenger switches off the direct airflow, then to maintain the in and out airflow speed, the fan may rotate in a counterclockwise direction so that there is not a load applied to the swing blades 410.

Figure 7:
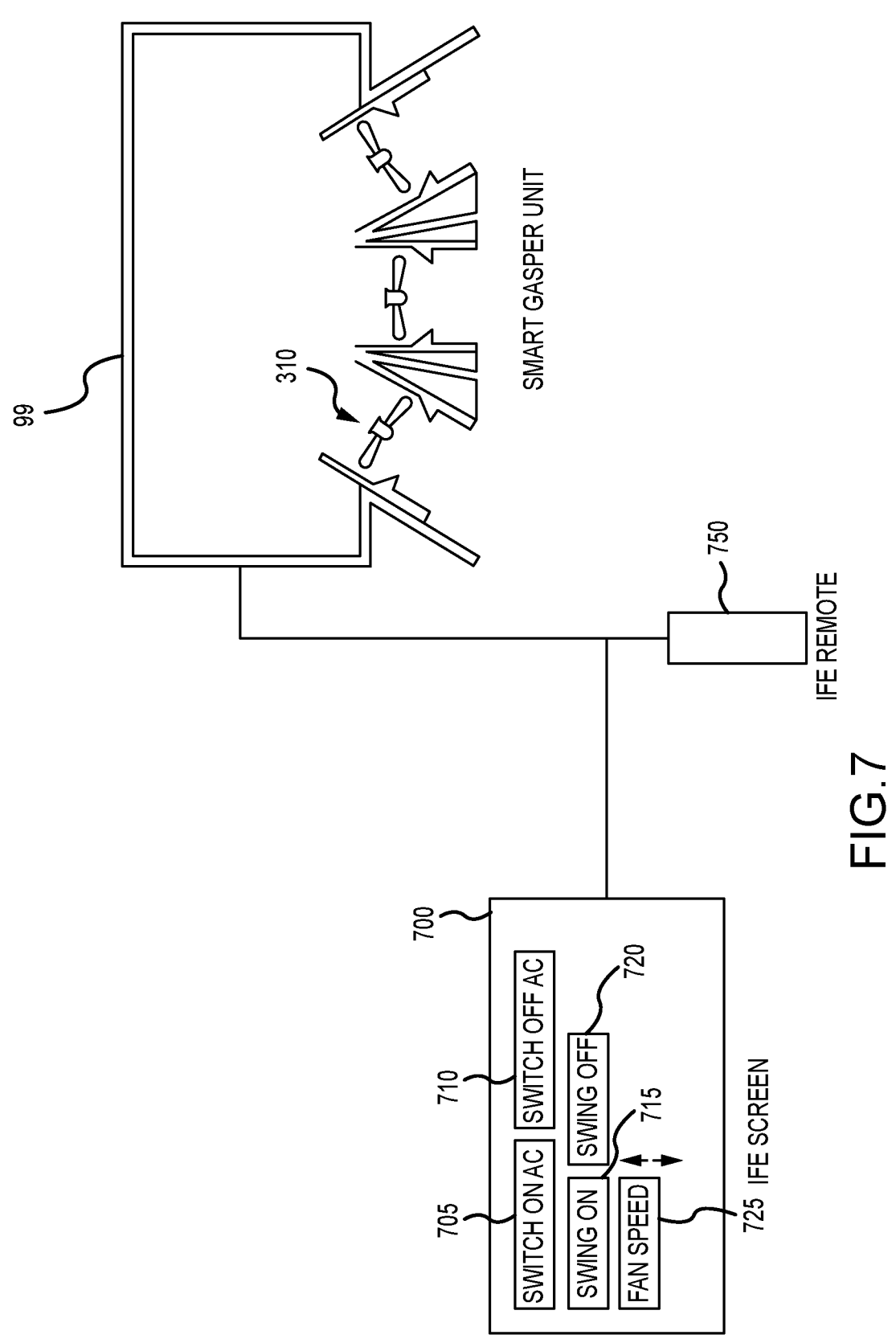
FIG. 7 illustrates a diagram of a gasper module coupled to an in-flight entertainment (IFE) control system to control the fan operation and the swing blade operation of the gasper module in accordance with various embodiments.

FIG. 7 illustrates a diagram of a gasper module coupled to an in-flight entertainment (IFE) control system to control the fan 310 operation and the swing blade 410 operation of the gasper module in accordance with various embodiments. In FIG. 7, the IFE display 700 is electronically connected to the gasper module 99 and includes a variety of control settings that are touch selective on the display screen. In various embodiments, the gasper module 99 can also be operated by an IFE remote 750. In various embodiments, the passenger using the IFE display 700 or IFE remote 750 can enable switching ON 705 of the air-conditioning (AC) that may be performed by the increasing of a forward airflow by the fan 310 clockwise rotation of blades and opening of the swing blades to direct air flow to the passenger. Other functions that the passenger can perform include switching OFF 710 of the AC that is performed by the counter-clock rotation of the fan 310 blades causing a reverse airflow in the gasper, switching ON 715 of the swing (i.e., back-and-forth) rotation of the swing blades to direct the airflow, switching OFF 720 of the swing blade back and forth rotations, and adjusting the fan speed 725.

Turning now to FIG. 8, FIG. 8 illustrates a flowchart of a manufacturing method of a gasper assembly in accordance with various embodiments. In FIG. 8, at step 810, the gasper module is assembled by the steps of assembling an inlet to receive intake air, assembling a first outlet to direct a stream of the airflow from the intake air towards a passenger, and assembling a second outlet configured to form an air curtain from the intake air between the passenger receiving a direct stream of airflow and an adjacent passenger. Also, at step 810, the method of manufacture includes assembling a fan with the first outlet to increase a velocity of intake air from the inlet that is streamed in an airflow directed toward the passenger.

At step 820, the method of manufacture includes assembling a plurality of swing blades configured with the first outlet that are adjustable by the passenger to circulate the stream of airflow across an envelope of space across a seat of the passenger, and attaching a solenoid device to the plurality of swing blades of the first outlet that enables a back-and-forth motion of the plurality of swing blades to circulate the stream of airflow across the envelope of space across the seat of the passenger. The plurality of swing blades are attached to the front exterior of the gasper module and each set has its own solenoid device for separate controlling to enable the uniform circulation of airflow by the dynamic back-and-forth motion across the passenger seat. At step 830 the gasper module is assembled with coupling to the connect to the power source available in the service panel that is used for lightening to power the fan and solenoid devices. Also, the gasper module is configured with a connection for coupling to the IFE control system to control the fan speed, and the swing blades.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gasper module for use in an aircraft, the gasper module comprising:
an inlet configured to receive intake air;
a first outlet configured to direct a stream of an airflow from the intake air; and
a second outlet configured to form an air curtain from the intake air between a passenger receiving the stream of the airflow and an adjacent passenger, the second outlet comprising an output vent that is configured to direct the air curtain at an angle between the passenger receiving the stream of the airflow and the adjacent passenger,
wherein the first outlet comprises a fan to increase a velocity of the stream of the airflow that is directed toward the passenger, and
wherein the fan is configured to rotate in a clockwise direction and a counterclockwise direction for directing the stream of the airflow from the first outlet to the passenger and for ceasing the stream of the airflow from the first outlet to the passenger.

2. The gasper module of claim 1, further comprising:
in response to ceasing the stream of the airflow from the first outlet by the fan to the passenger, the second outlet is configured to continue to maintain the air curtain between the passenger and the adjacent passenger.

3. The gasper module of claim 2, wherein the fan continues ceasing the airflow from the first outlet by a continuous operation of rotation while the second outlet continues to maintain the air curtain.

4. The gasper module of claim 1, further comprising:
a plurality of swing blades configured with the first outlet that are adjustable by the passenger to circulate the stream of the airflow across an envelope of space across a seat of the passenger.

5. The gasper module of claim 4, further comprising:
a solenoid device coupled to the plurality of swing blades of the first outlet that enables a back-and-forth motion of the plurality of swing blades to circulate the stream of the airflow across the envelope of space across the seat of the passenger.

6. The gasper module of claim 5, wherein the plurality of swing blades can be positioned by selection at positions in a range of 0 degrees to 180 degrees.

7. A module for controlling airflow in an aircraft, the module comprising:
an inlet;
a first outlet;
a second outlet having an output vent;
a fan configured with the first outlet to increase a velocity of intake air from the inlet that is streamed in the airflow;
wherein the first outlet is configured to direct a stream of an airflow of intake air from the inlet,
wherein the second outlet is configured to form an air curtain from the airflow of intake air from the inlet, the output vent being configured to direct the air curtain between a first passenger and a second passenger, and
wherein the fan is configured to rotate in a clockwise direction and a counterclockwise direction for directing the stream of the airflow from the first outlet to the first passenger and for ceasing the stream of the airflow from the first outlet to the first passenger.

8. The module of claim 7, further comprising:
in response to ceasing the stream of the airflow from the first outlet by the fan to the passenger, the second outlet is configured to continue to maintain the air curtain between the passenger and the second passenger.

9. The module of claim 8, further comprising:
a plurality of swing blades configured with the first outlet that are adjustable to circulate the stream of the airflow across an envelope of space across a seat.

10. The module of claim 9, further comprising:
a solenoid device coupled to the plurality of swing blades of the first outlet that enables a back-and-forth motion of the plurality of swing blades to circulate the stream of the airflow across the envelope of space.

11. The module of claim 10, wherein the plurality of swing blades can be positioned by selection at positions in a range of 0 degrees to 180 degrees.

12. A method of manufacturing a gasper module in an apparatus to direct airflow in an aircraft, the method comprising:

assembling an inlet to receive intake air;

assembling a first outlet to direct a stream of the airflow from the intake air towards a passenger;

assembling a second outlet configured to form an air curtain from the intake air between the passenger receiving the stream of the airflow and an adjacent passenger;

assembling a plurality of swing blades configured with the first outlet that are adjustable by the passenger to circulate the stream of the airflow across an envelope of space across a seat of the passenger; and attaching a solenoid device to the plurality of swing blades of the first outlet that enables a back-and-forth motion of the plurality of swing blades to circulate the stream of the airflow across the envelope of space across the seat of the passenger.

13. The method of manufacturing of claim 12, further comprising:

assembling a fan with the first outlet to increase a velocity of intake air from the inlet that is streamed in an airflow that is directed in a downward direction toward the passenger.

14. A gasper module for use in an aircraft, the gasper module comprising:

an inlet configured to receive intake air;

a first outlet configured to direct a stream of an airflow from the intake air;

a second outlet configured to form an air curtain from the intake air between a passenger receiving the stream of the airflow and an adjacent passenger;

a plurality of swing blades configured with the first outlet that are adjustable by the passenger to circulate the stream of the airflow across an envelope of space across a seat of the passenger; and a solenoid device coupled to the plurality of swing blades of the first outlet that enables a back-and-forth motion of the plurality of swing blades to circulate the stream of the airflow across the envelope of space across the seat of the passenger.

\* \* \* \* \*